United States Patent
Jung et al.

(10) Patent No.: US 12,308,453 B2
(45) Date of Patent: May 20, 2025

(54) BATTERY MODULE

(71) Applicant: LG Chem, Ltd., Seoul (KR)

(72) Inventors: Kitaek Jung, Daejeon (KR); Sangwook Yim, Daejeon (KR); Younggil Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1077 days.

(21) Appl. No.: 17/266,793

(22) PCT Filed: Feb. 25, 2020

(86) PCT No.: PCT/KR2020/002681
§ 371 (c)(1),
(2) Date: Feb. 8, 2021

(87) PCT Pub. No.: WO2020/175881
PCT Pub. Date: Sep. 3, 2020

(65) Prior Publication Data
US 2021/0344074 A1    Nov. 4, 2021

(30) Foreign Application Priority Data
Feb. 26, 2019    (KR) .......................... 10-2019-0022719

(51) Int. Cl.
*H01M 50/24* (2021.01)
*H01M 10/04* (2006.01)
(Continued)

(52) U.S. Cl.
CPC ....... *H01M 50/24* (2021.01); *H01M 10/0486* (2013.01); *H01M 50/224* (2021.01);
(Continued)

(58) Field of Classification Search
CPC .... H01M 50/24; H01M 50/231; H01M 50/50; H01M 50/505; H01M 50/224;
(Continued)

(56) References Cited

U.S. PATENT DOCUMENTS

| 5,663,008 A | 9/1997 | Shimakawa et al. |
| 6,492,058 B1 | 12/2002 | Watanabe et al. |

(Continued)

FOREIGN PATENT DOCUMENTS

| CN | 1134041 A | 10/1996 |
| CN | 106711366 A | 5/2017 |

(Continued)

OTHER PUBLICATIONS

International Search Report for Application No. PCT/KR2020/002681, dated Jun. 4, 2020, 3 pages.
(Continued)

*Primary Examiner* — Niki Bakhtiari
*Assistant Examiner* — Niara Trant
(74) *Attorney, Agent, or Firm* — Lerner David LLP (57) ABSTRACT

A battery module includes a battery cell assembly in which a plurality of battery cells are stacked adjacent to each other side by side; a module frame receiving the battery cell assembly; and an end plate disposed at one end of the battery cell assembly in a length direction, wherein the end plate includes a main body portion including a welding portion welding-coupled with the module frame and an insulating coating portion coating an entire surface of the main body portion except for the welding portion.

16 Claims, 5 Drawing Sheets

(51) Int. Cl.
*H01M 50/211* (2021.01)
*H01M 50/224* (2021.01)
*H01M 50/231* (2021.01)
*H01M 50/50* (2021.01)
*H01M 50/505* (2021.01)
*H01M 50/593* (2021.01)

(52) U.S. Cl.
CPC ......... *H01M 50/231* (2021.01); *H01M 50/50* (2021.01); *H01M 50/505* (2021.01); *H01M 50/593* (2021.01); *H01M 50/211* (2021.01); *H01M 2220/20* (2013.01)

(58) Field of Classification Search
CPC .......... H01M 50/593; H01M 10/0486; H01M 50/211; H01M 2220/20
See application file for complete search history.

(56) References Cited

U.S. PATENT DOCUMENTS

| | | | |
|---|---|---|---|
| 9,837,687 | B2 | 12/2017 | Lee et al. |
| 10,658,716 | B2 | 5/2020 | Lee et al. |
| 2012/0003505 | A1* | 1/2012 | Kim ................... H01M 10/425 429/7 |
| 2013/0288105 | A1 | 10/2013 | Niedzwiecki et al. |
| 2014/0212731 | A1 | 7/2014 | Lim |
| 2017/0084886 | A1* | 3/2017 | Tononishi ........... H01M 50/271 |
| 2017/0141365 | A1 | 5/2017 | Kim et al. |
| 2018/0019454 | A1 | 1/2018 | Okada et al. |
| 2018/0138474 | A1 | 5/2018 | Choi et al. |
| 2020/0014005 | A1* | 1/2020 | Lee ........................ F16M 11/22 |
| 2020/0411924 | A1* | 12/2020 | Yun ..................... H01M 50/298 |
| 2021/0351470 | A1* | 11/2021 | Uemura .............. H01M 50/284 |

FOREIGN PATENT DOCUMENTS

| | | |
|---|---|---|
| CN | 206727133 U | 12/2017 |
| CN | 108140763 A | 6/2018 |
| DE | 102013204670 B3 | 5/2014 |
| JP | H08250151 A | 9/1996 |
| JP | 2006318703 A | 11/2006 |
| JP | 2014203747 A | 10/2014 |
| JP | 2015518258 A | 6/2015 |
| JP | 2018520475 A | 7/2018 |
| KR | 20000057767 A | 9/2000 |
| KR | 20120048802 A | 5/2012 |
| KR | 20130110943 A | 10/2013 |
| KR | 20140098439 A | 8/2014 |
| KR | 20150069810 A | 6/2015 |
| KR | 20170022119 A | 3/2017 |
| KR | 20170036639 A | 4/2017 |
| KR | 20170053429 A | 5/2017 |
| KR | 20180047696 A | 5/2018 |
| KR | 20190053358 A | 5/2019 |
| WO | 2016157267 A1 | 10/2016 |

OTHER PUBLICATIONS

Extended European Search Report for EP Application No. 20763079.9 dated Oct. 4, 2021, 3 pgs.
Search Report dated Aug. 9, 2022 from the Office Action for Chinese Application No. 202080004556.1 issued Aug. 16, 2022, pp. 1-3.

* cited by examiner

BATTERY MODULE

CROSS-REFERENCE TO RELATED APPLICATIONS

This application is a national phase entry under 35 U.S.C. § 371 of International Application No. PCT/KR2020/002681, filed on Feb. 25, 2020, published in Korean, which claims priority to and the benefit of Korean Patent Application No. 10-2019-0022719 filed in the Korean Intellectual Property Office on Feb. 26, 2019, the entire contents of which are incorporated herein by reference.

BACKGROUND OF THE INVENTION

(a) Field of the Invention

The present invention relates to a battery module, and more particularly, to a battery module including an end plate having insulating performance.

(b) Description of the Related Art

Rechargeable batteries having high application characteristics and electrical characteristics such as high energy density according to their products are widely applied to battery vehicles, hybrid vehicles, and electric power storage devices driven by electric driving sources as well as portable devices. These rechargeable batteries are attracting attention as new energy sources for improving environmental-friendliness and energy efficiency in that they do not generate any by-products of energy use as well as their primary merit, in which they can drastically reduce the use of fossil fuels.

The battery pack applied to the electric vehicle has a structure in which a plurality of cell assemblies including a plurality of unit cells are coupled in series to obtain high power. And the unit cell may be repeatedly charged and discharged by an electrochemical reaction between constituent elements by including positive electrode and negative electrode current collectors, separators, active materials, and electrolyte solutions.

On the other hand, as the need for a large capacity structure has increased in recent years, as well as utilization as an energy storage source, a demand for the battery pack of a multi-module structure collecting a plurality of battery modules in which a plurality of rechargeable batteries are coupled in series and/or in parallel is increasing.

When a plurality of battery cells are coupled in series/in parallel to configure the battery pack, a method of which a battery module is first composed of at least one battery cell and other constituent elements are added using this at least one battery module to construct the battery pack is common. The number of battery modules included in the battery pack or the number of the battery cells included in the battery module may be variously set according to a required output voltage or a charge and discharge capacity.

When constructing the battery pack using a plurality of battery modules, it is necessary to reduce the size of the space occupied by one battery module as much as possible for high energy density, and for safety, there is also a demand that insulation should be sufficiently secured between the parts in the battery module. However, if a component of a plastic material such as an insulating plate is added in order to secure insulation performance, the size of the battery module increases by as much as the size of the component, and a burden on a process for assembling the added component increases. There is also a problem that stiffness of the entire battery module may also be lowered because a ratio of this low plastic component having the relative stiffness is increased.

SUMMARY OF THE INVENTION

The present invention to solve this problem provides a battery module for increasing energy density by reducing a size of the battery module by reducing the number of parts in the battery module, and at the same time, is capable of securing sufficient insulation performance and stiffness of the battery module.

However, the objective of the present invention is not limited to the aforementioned one, and may be extended in various ways within the spirit and scope of the present invention.

A battery module according to an exemplary embodiment of the present invention includes: a battery cell assembly in which a plurality of battery cells are stacked adjacent to each other side by side; a module frame receiving the battery cell assembly; and an end plate disposed at one end of the battery cell assembly in a length direction, wherein the end plate includes a main body portion including a welding portion welding-coupled with the module frame and an insulating coating portion coating an entire surface of the main body portion except for the welding portion.

The end plate may include an inner side facing the battery cell assembly and an outer side disposed opposite to the inner side, and the insulating coating portion may be disposed on the inner side and the outer side.

The insulating coating portion may include at least one selected from an epoxy-based resin, a silicon-based resin, a polycarbonate resin, a polypropylene resin, or an acrylonitrile-butadiene-styrene resin.

A thickness of the insulating coating portion may be 20 μm to 200 μm.

A thickness of the insulating coating portion may be 50 to 140 μm.

The main body portion may be made of a metal material.

The metal material may include at least one selected from iron, aluminum, magnesium, or alloys thereof.

A thickness of the main body portion may be 1.0 mm to 3.5 mm.

A bus bar electrically connected to an electrode lead of the battery cell assembly may be further included, and the end plate may include a terminal opening exposing the bus bar.

The insulating coating portion may be formed to surround the terminal opening.

A bus bar frame fixed to the bus bar disposed between the battery cell assembly and the end plate may be further included, and the end plate may be disposed directly adjacent to the bus bar frame.

The insulating coating portion may include at least one protrusion portion protruded toward the battery cell assembly from the inner side.

A battery pack according to another exemplary embodiment of the present invention may include at least one of the above-described battery modules and a pack case packaging the at least one of the battery modules.

A device according to another exemplary embodiment of the present invention may include at least one battery pack above-described.

According to exemplary embodiments, without an insulating cover or the like provided for insulation between the end plate and the battery cell assembly, the battery module capable of securing the sufficient insulation performance and simultaneously increasing the energy density of the battery module and improving the stiffness of the battery module may be provided.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thickness of some layers and areas is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Figure 1:
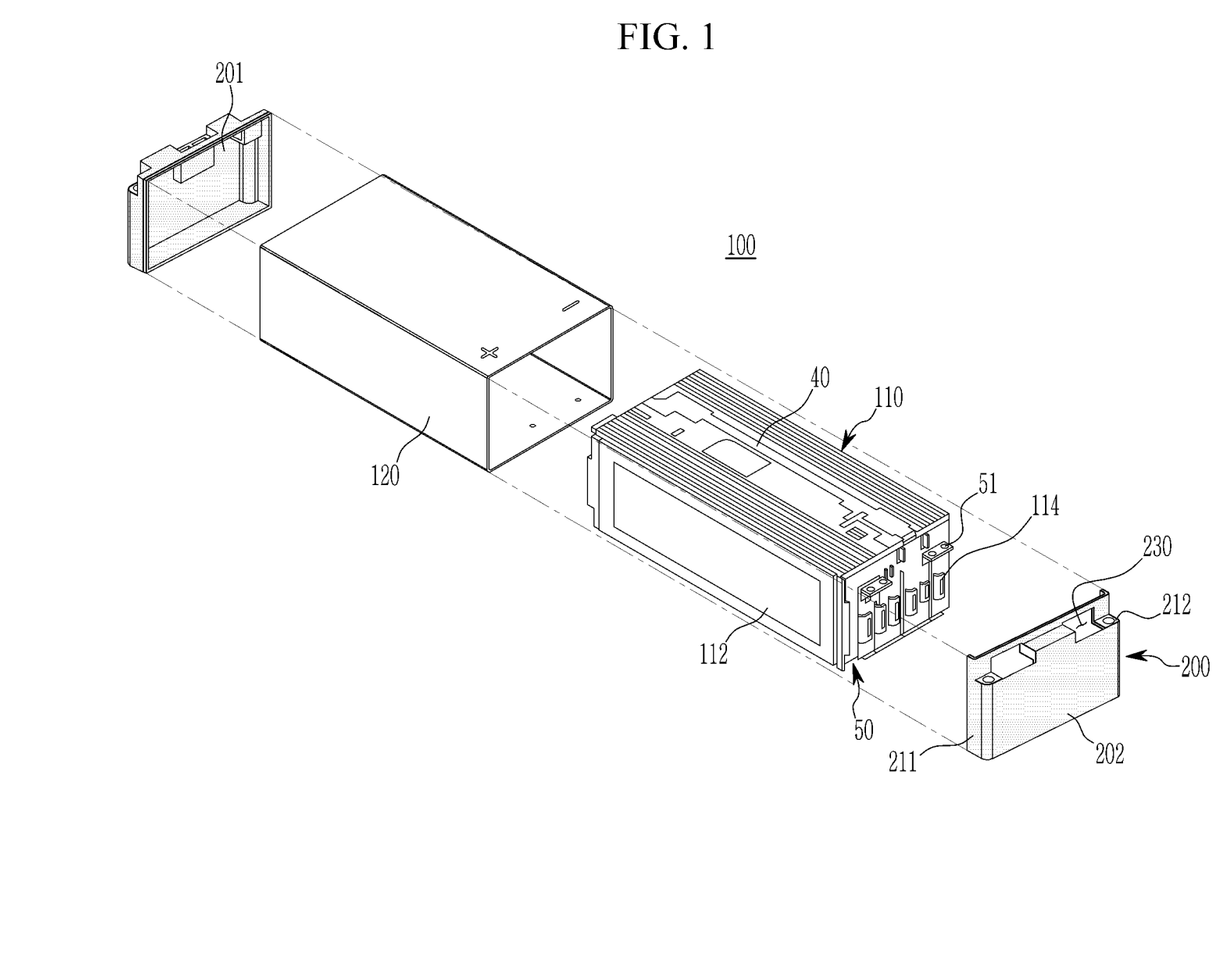
FIG. 1 is a perspective view of a battery module according to an exemplary embodiment of the present invention.

FIG. 1 is a perspective view of a battery module according to an exemplary embodiment of the present invention.

Referring to FIG. 1, a battery module 100 according to the present exemplary embodiment includes a battery cell assembly 110 in which a plurality of battery cells 112 are stacked side by side adjacent to each other, a module frame 120 receiving the battery cell assembly 110 and forming an appearance of the battery module 100, and end plates 200 disposed at both ends, respectively, of the battery cell assembly 120 in a length direction and coupled with the module frame 120 by welding.

The battery cell assembly 110 is a collection of the rechargeable batteries including a plurality of battery cells 112. The battery cell assembly 110 may include a plurality of battery cells 112, and each battery cell includes an electrode lead 114. The battery cell 112 may be a pouch-type battery cell having a plate shape, but is not limited thereto. The electrode lead 114 may be a positive lead or a negative lead, and the end portion of the electrode lead 114 of each battery cell 112 may be bent in one direction and may be in contact with the end portion of the electrode lead of another battery cell 112 adjacent thereto. Two electrode leads 114 that come into contact with each other may be fixed through welding, etc., thereby making an electrical connection between the battery cells 112 inside the battery cell assembly 110.

A plurality of battery cells 112 are stacked vertically so that the electrode leads 114 are aligned in one direction, thereby forming the battery cell assembly 110. The battery cell assembly 110 is received in the module frame 120 having at least one opening opened in the length direction of the battery cell assembly 110. In this case, the electrode leads 114 are drawn out outside the module frame 120 through the opening, and a bus bar frame 50 coupled with the battery cell assembly 110 in the direction that the electrode lead 114 is drawn out may be included. In the bus bar frame 50, a bus bar 51 may be fixed toward the outside, and the electrode leads 114 of the battery cell assembly 110 are electrically connected to the bus bar 51 while passing through a slit formed in the bus bar frame 50. Here, the bus bar frame 50 may be made of an insulating material, for example, a non-conductive synthetic resin, and the bus bar 51 may be made of a metal material having conductivity.

In addition, the battery module 100 includes a flexible printed circuit board (FPCB) 40 that is extended and mounted in the length direction of the module frame 120 at the top of the battery cell assembly 110 and configured to sense the battery cell 112. In addition, the battery module 100 may include various electrical components and may include, for example, an internal circuit board (ICB) and a battery management system (BMS). The electrical components such as the ICB and BMS board may be electrically connected to a plurality of battery cells.

Next, the configuration of the end plate 200 is described in detail with reference to FIG. 2 to FIG. 4 in addition to FIG. 1.

Figure 2:
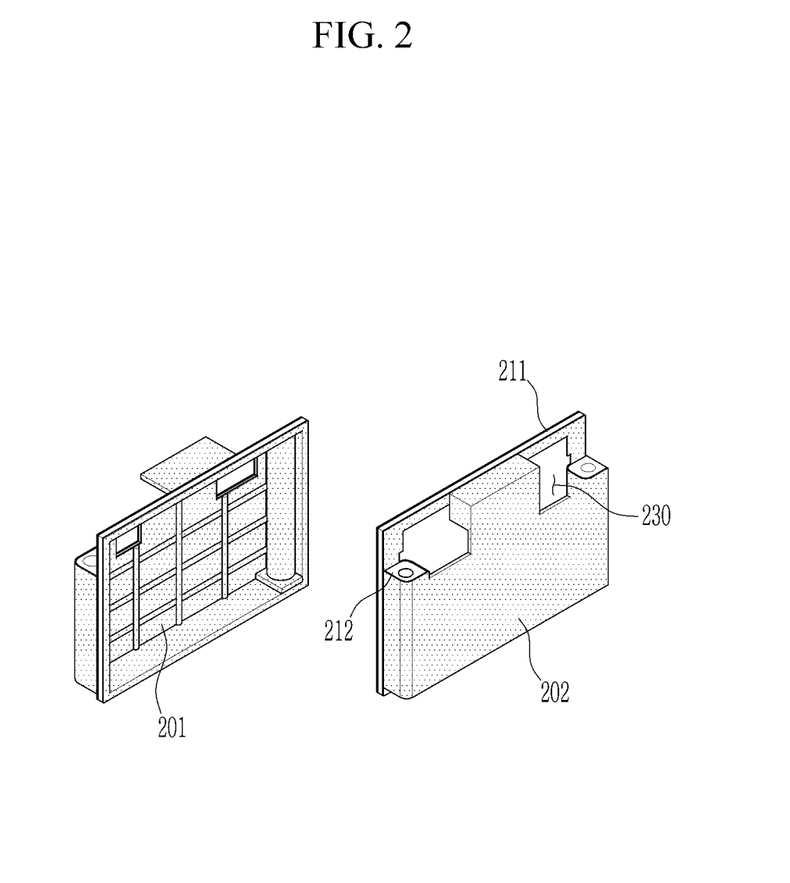
FIG. 2 is a view showing an end plate of a battery module according to an exemplary embodiment of the present invention.
Figure 3:
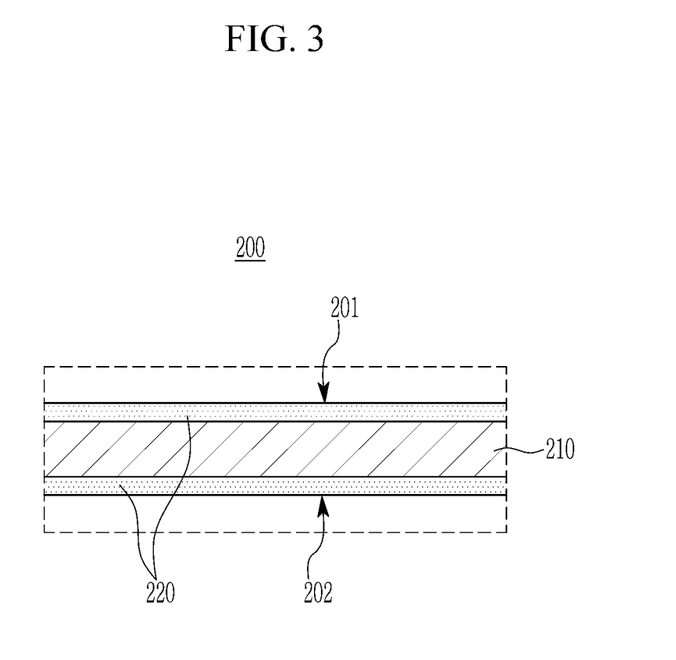
FIG. 3 is a partial cross-sectional view of a cut portion of an end plate.
Figure 4:
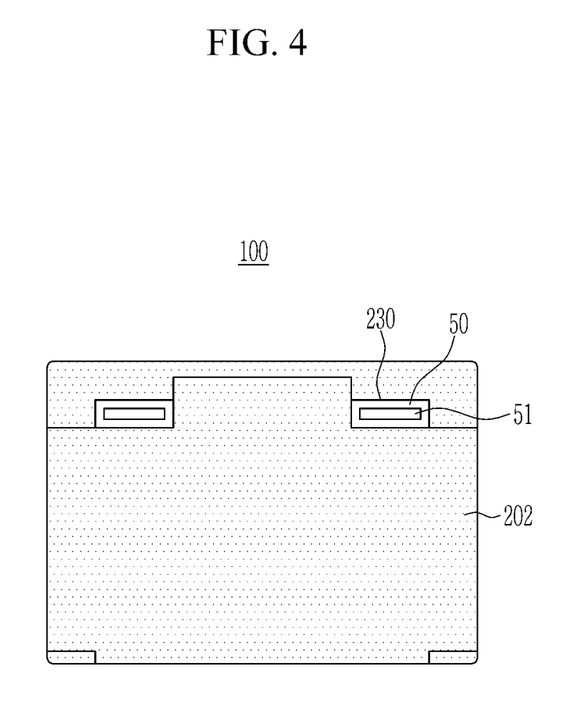
FIG. 4 is a view of a battery module according to an exemplary embodiment of the present invention shown from a front surface.

FIG. 2 is a view showing an end plate 200 of a battery module 100 according to an exemplary embodiment of the present invention, FIG. 3 is a partial cross-sectional view of a cut portion of an end plate 200, and FIG. 4 is a view of a battery module 100 according to an exemplary embodiment of the present invention shown from a front surface.

The end plate 200 is coupled to the opening of the module frame 120 while covering the bus bar frame 50 at both ends of the battery cell assembly 110, and at this time, it is coupled at the module frame 120 and a welding portion 211.

The end plate 200 includes a main body portion 210 made of a metal material and an insulating coating portion 220 formed by being coated on the entire surface of the main body portion 210. At this time, the insulating coating portion 220 is coated on the entire main body portion 210 except the welding portion 211. That is, as shown in FIG. 3, in the end plate 200, the insulating coating portion 220 is also disposed at the portion disposed at the opposite side of an inner side 201 and corresponding to an outer side 202 as the portion exposed outside the battery module 100 as well as the inner side 201 facing the battery cell assembly 110 and in direct contact with the bus bar frame 50.

By this configuration, even without providing an additional insulating cover or an insulating sheet between the end plate 200 and the battery cell assembly 110, sufficient insulation between components positioned inside the end plate 200 and the end plate 200 may be maintained.

In this case, the insulating coating portion 220 may include at least one selected from an epoxy-based resin, a silicon-based resin, a polycarbonate (PC) resin, a polypropylene (PP) resin, and an acrylonitrile-butadiene-styrene (ABS) resin. Also, a thickness (i.e., a thickness of a layer coated on the surface of the main body portion 210) of the insulating coating portion 220 may be 20 μm to 200 μm. If the thickness of the insulating coating portion 220 is less than 20 μm, sufficient insulation performance cannot be obtained, and if the thickness thereof exceeds 200 μm, it is not preferable because the thickness becomes too thick to have the effect of the part reduction. More preferably, the thickness of the insulating coating portion 220 may be 50 μm to 140 μm.

The main body portion 210 may be made of a metal material which, for example, may include at least one selected from iron, aluminum, magnesium, or alloys thereof. Also, the thickness of the main body portion 210 may be 1.0 mm to 3.5 mm. If the thickness of the main body portion 210 is less than 1.0 mm, sufficient rigidity to protect the battery module 100 from an external impact, etc. cannot be secured, and if the thickness thereof exceeds 3.5 mm, the weight thereof is excessively increased such that an increase of the weight of the entire battery module 100 is caused which is not preferable.

Also, the end plate 200 includes a terminal opening 230 in which the bus bar 51 is fixed to the bus bar frame 50 toward the outside. In this case, the insulating coating portion 220 to surround the terminal opening 230 is formed. Thereby, the sufficient insulation performance may be secured between the bus bar 51 and the main body portion 210 of the metal material, and particularly a sufficient creeping distance may be secured. Here, the creeping distance is a distance to be secured for insulation and is a distance depending on the insulator surface between two conductors. According to the configuration of the present exemplary embodiment, since the insulating coating portion 220 is formed on all of the portion surrounding the outside surface 202 and the terminal opening 230 as well as the inside surface 201 of the end plate 200, compared with a conventional art in which an insulating sheet or a coating is only disposed inside the end plate 200, the longer creeping distance may be secured, so it is not necessary to unduly increase the thickness of the insulating sheet to the coating to secure the insulation distance, thereby a design margin may also be improved.

Particularly, conventionally, an insulating cover (or an insulating sheet) is separately provided for the insulation between the battery cell assembly 110, and the bus bar frame 50 and the end plate 200, and in this case, compared with the configuration of the present exemplary embodiment, two or more parts are needed per one battery module 100, and the thickness of the entire battery module 100 has to be increased by the thickness of the added parts. However, according to the present exemplary embodiment, because the insulating coating portion 220 formed on the inner side 201 and the outer side 202 of the end plate 200 may secure sufficient insulating performance as described above, the insulating cover (or the insulating sheet) may be omitted, and as a result, the size of the entire battery module 100 is also reduced, resulting in an increase in the energy density.

In addition, as shown in FIG. 4, according to the configuration of the present exemplary embodiment, the battery module 100 may be more effectively protected from external impact because an amount of an injection material exposed outside for the insulation around the bus bar 51 (for example, a conventional insulating cover or bus bar frame) may be extremely reduced. That is, even if the injection material is not exposed, since the sufficient insulating distance is secured by the insulating coating portion 220 formed on the inner side 201 and the outer side 202 of the end plate 200, it is possible to cover the entire front of the battery cell assembly 110 excluding the portion corresponding to the bus bar 51 by the plate 200. At this time, since the main body portion 210 of the metal material is disposed inside the end plate 200 and has excellent rigidity, the rigidity of the battery module 100 may be increased by increasing the portion covered by the end plate 200.

Also, the end plate 200 further includes an outer coupling portion 212 to electrically connect the battery module 100 to the outside, and the insulating coating portion 220 is removed in the outer coupling portion 212 to expose the main body portion 210. Through this configuration, the sufficient insulation performance may be obtained by the insulating coating portion 220 disposed around the outer coupling portion 212 while achieving the electrical connection with the outside.

Figure 5:
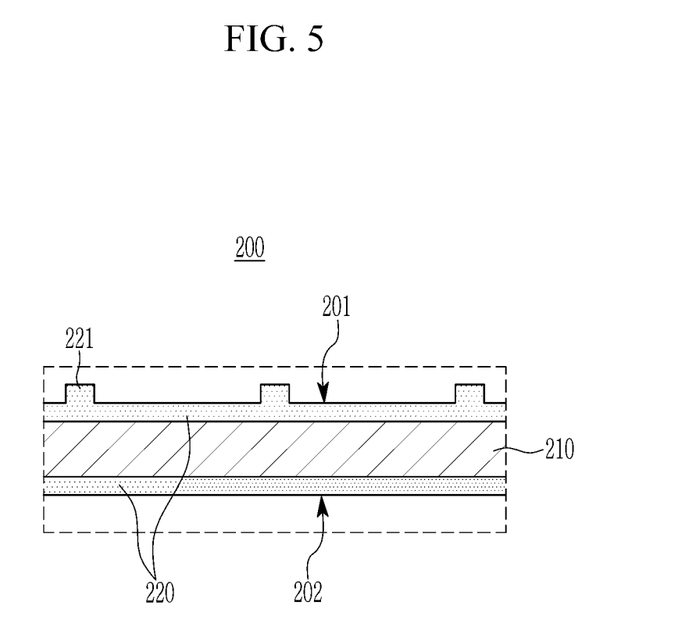
FIG. 5 is a partial cross-sectional view showing a cut part of the end plate according to another exemplary embodiment of the present invention.

On the other hand, the insulating coating portion 220 may include at least one protrusion portion 221 protruded toward the battery cell assembly 110 from the inner side 201 of the end plate 200. The protrusion portion 221 may be configured to maintain an appropriate distance between the battery cell assembly 110 and the end plate 200 by being in contact with parts coupled to the battery cell assembly 110. As a result, while reducing the entire thickness of the insulating coating portion 220, the insulation distance between the end plate 200 and the battery cell assembly 110 may be secured by the protrusion portion 221, thereby securing the insulation between the parts while reducing the entire weight of the battery module 100.

The end plate 200 of the present exemplary embodiment may be formed by removing the insulating coating portion 220 on the portion required by computer numerical control (CNC) machining after forming the insulating coating portion 220 for the entire main body portion 210 of the metal material. Particularly, at this time, since the welding portion and the outer coupling portion 212, which are the portions where the insulating coating portion 220 is removed, are portions formed for coupling with other components, precise dimensional control is important, and the necessary dimensional control can be precisely performed through the CNC machining.

Thus, according to an exemplary embodiment of the present invention, by providing the insulating coating portion formed on the inner side and outer side of the end plate, it is possible to secure the sufficient insulation performance without additional parts for insulation such that the size of the battery module may be reduced and the rigidity of the battery module may be improved.

Meanwhile, one or more of the battery modules according to an exemplary embodiment of the present invention may be packaged in a pack case to form the battery pack.

The battery module described above and the battery pack including the same may be applied to various devices. Such a device may be a transportation means such as an electric bicycle, an electric vehicle, a hybrid vehicle, etc., but the present invention is not limited to this, and may be applied to various devices capable of using the battery module and the battery pack including the same, which belongs to the scope of the present invention.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: battery module
110: battery cell assembly
200: end plate
210: main body portion
220: insulating coating portion

What is claimed is:

1. A battery module comprising:
a battery cell assembly in which a plurality of battery cells are stacked adjacent to each other side by side;
a module frame receiving the battery cell assembly; and
an end plate disposed at one end of the battery cell assembly in a length direction,
wherein the end plate includes a main body portion including a welding portion welding-coupled with the module frame and an insulating coating portion coating an entire surface of the main body portion except for the welding portion,
wherein the insulating coating portion is supported by the entire surface of the main body portion except for the welding portion,
wherein the end plate includes an inner side facing the battery cell assembly and an outer side disposed opposite to the inner side, and the insulating coating portion is disposed on the inner side and the outer side, and
wherein the insulating coating portion includes at least one protrusion portion protruded toward the battery cell assembly from the inner side.

2. The battery module of claim 1, wherein
the insulating coating portion includes at least one selected from an epoxy-based resin, a silicon-based resin, a polycarbonate resin, a polypropylene resin, or an acrylonitrile-butadiene-styrene resin.

3. The battery module of claim 1, wherein
a thickness of the insulating coating portion is 20 μm to 200 μm.

4. The battery module of claim 1, wherein
a thickness of the insulating coating portion is 50 μm to 140 μm.

5. The battery module of claim 1, wherein
the main body portion is made of a metal material.

6. The battery module of claim 5, wherein
the metal material includes at least one selected from iron, aluminum, magnesium, or alloys thereof.

7. The battery module of claim 1, wherein
a thickness of the main body portion is 1.0 mm to 3.5 mm.

8. The battery module of claim 1, further comprising
a bus bar electrically connected to an electrode lead of the battery cell assembly, and the end plate includes a terminal opening exposing the bus bar.

9. The battery module of claim 8, wherein
the insulating coating portion is formed to surround the terminal opening.

10. The battery module of claim 8, further comprising
a bus bar frame fixed to the bus bar disposed between the battery cell assembly and the end plate, and the end plate is disposed directly adjacent to the bus bar frame.

11. The battery module of claim 1, wherein
the end plate further includes an outer coupling portion to electrically connect the battery module to an outside, and the insulating coating portion is removed in the outer coupling portion to expose the main body portion.

12. A battery pack comprising:
at least one of the battery modules of claim 1; and
a case packaging the at least one of the battery modules.

13. A device comprising at least one battery pack of claim 12.

14. The battery module of claim 1, further comprising
a second end plate disposed at another end of the battery cell assembly in the length direction,
wherein the second end plate includes a second main body portion including a second welding portion welding-coupled with the module frame and a second insulating coating portion coating an entire surface of the second main body portion except for the second welding portion.

15. The battery module of claim 1, wherein the end plate covers an entire end of the module frame,
wherein the module frame includes a first opening and a second opening disposed opposite one another in the length direction, and
wherein the first opening and the second opening are configured to receive the battery cell assembly therethrough along the length direction.

16. The battery module of claim 1, wherein the module frame encircles the battery cell assembly about an axis extending along the length direction.

* * * * *